United States Patent [19]
Thies

[11] 3,868,018
[45] Feb. 25, 1975

[54] TAPE REEL CARTRIDGE STORAGE CELL

[75] Inventor: Joel O. Thies, Boulder, Colo.

[73] Assignee: Xytex Corporation, Boulder, Colo.

[22] Filed: Oct. 27, 1972

[21] Appl. No.: 301,434

[52] U.S. Cl. .................... 211/40, 211/49 D, 312/20
[51] Int. Cl. ........................ A47b 81/06, A65h 75/00
[58] Field of Search ......... 211/40, 20, 23, 72, 49 D, 211/71, 17–19, 22, 24, 5; 312/20, 10, 124, 121, 45

[56] References Cited

UNITED STATES PATENTS

| | | | |
|---|---|---|---|
| 565,057 | 8/1896 | Westphal | 211/5 |
| 565,058 | 8/1896 | Westphal | 211/5 X |
| 896,637 | 8/1908 | Herrman | 312/10 |
| 1,711,329 | 4/1929 | Short | 211/49 D UX |
| 2,228,775 | 1/1941 | Morgan | 211/49 D UX |
| 2,546,470 | 3/1951 | Mueller | 312/10 UX |
| 2,621,815 | 12/1952 | Gannon | 211/20 X |
| 3,092,256 | 6/1963 | Vernik | 211/40 |
| 3,214,029 | 10/1965 | Jack | 211/40 |
| 3,338,421 | 8/1967 | Lyman | 312/10 X |
| 3,393,808 | 7/1968 | Chirchill | 312/45 X |
| 3,603,460 | 9/1971 | Notes | 211/40 |
| 3,613,895 | 10/1971 | Larkin | 211/40 |

*Primary Examiner*—Roy D. Frazier
*Assistant Examiner*—Abraham Frankel

[57] ABSTRACT

A reel storage cell is specifically adapted for use in automated computer storage or library systems and is made up of a unitary body construction which can be suspended from a vertical wall panel or otherwise supported to present at least one forwardly directed, arcuate, reel-receiving groove conforming to the contour of the outer peripheral edge of a reel cartridge. Latching fingers flank opposite sides of each groove and also face in a forward direction so that when a reel cartridge is advanced edgewise between the fingers and into the groove, the fingers will exert a holding force on the reel cartridge so as to cooperate with the groove in releasably locking the reel cartridge on edge in the groove. The storage cell facilitates positioning and release of the reel cartridges by automatic selector/positioning mechanisms in an automated tape storage system and is so designed as to permit arrangement of a series of grooves in closely spaced, side-by-side relation to one another for compact storage of a plurality of reel cartridges.

12 Claims, 6 Drawing Figures

TAPE REEL CARTRIDGE STORAGE CELL

This invention relates generally to tape reel storage units and more particularly relates to tape reel cartridge storage cells which are specifically adapted for use in automated computer tape storage or library systems.

There is an ever-increasing demand for automated computer tape library systems which will serve as on-line storage subsystems for standard computer tape reels, such as, for example, the IBM-type self-threaded threading cartridge as set forth and described in U.S. Letters Pat. No. 3,620,478 to Fitzgerald. Most desirably, the library system will perform the functions of storing reels of tape, automatically and selectively advancing the reels from the storage position to a standard, self-threading tape drive, loading the tape reel on the tape drive hub, and thereafter unloading the tape reel from the drive and restoring it to its original storage position. One automated tape library of the type referred to is that owned by Xytex Corporation, assignee of the present invention, in which the major components of the automatic tape system are a library control unit which provides an electronic interface between the tape library and the selector channel of an IBM system 360 or 370 and includes a reel selector-positioning mechanism which is programmed to physically select and remove a tape reel from its storage location and advance it into position for engagement by an automatic reel mounting unit which mounts the reel automatically on the hub of a magnetic tape drive. The housing for the entire system is preferably of modular construction with each modular unit containing rows and columns of storage cells constructed and arranged according to the present invention for removable suspension from the inner surfaces of opposite side walls of each unit so that the cells on opposite sides are arranged in spaced, inwardly facing relation to one another. In an automated tape library system, conventionally a selector-positioning mechanism can be programmed to advance across the rows and columns of tape reels stored on edge in the storage cells, select a tape reel stored at a particular location, remove it and advance it to a separate location within the modular unit for engagement by the automated reel mounting unit. It will therefore be appreciated that it is important in an automated tape library system that the reel cartridges be positively but releasably latched in their storage position and so aligned as to facilitate ready engagement and removal by the selector-positioning mechanism as well as to permit return to the same storage position and permit accurate replacement even when the selector-positioning mechanism is slightly misaligned with the storage cell. Moreover, it is highly desirable to eliminate moving parts in the storage cells and to provide a compact, one-piece body construction which will be capable of accommodating a number of reel cartridges.

Accordingly, it is an object of the present invention to provide for a novel and improved cartridge cell which is adaptable for storage of reel cartridges in an automated computer tape storage system in a reliable and efficient manner.

It is another object of the present invention to provide for a novel reel cartridge storage cell which is low-cost, of unitary construction and permits positive, releasable latching of a reel cartridge without the necessity of moving parts or mechanisms which must be closely synchronized with the movement of a selector mechanism for each reel cartridge to be removed or replaced.

It is another object of the present invention to provide for a tape reel cartridge storage device of unitary construction which will permit low-cost storage of a plurality of reel cartridges in a novel and efficient manner and which is capable of securely but releasably holding each cartridge in such a way as to facilitate ready removal and replacement.

It is a still further object of the present invention to provide for a tape reel cartridge storage cell capable of storing a plurality of reel cartridges on edge in closely spaced, side-by-side relation to one another which is rugged and durable, can be releasably mounted or otherwise suspended on a vertical wall panel or other location, is capable of receiving each reel cartridge and accurately storing same even when the picking mechanism is slightly misaligned with the intended storage position on the cartridge cell and will not generate static electrical charges which would otherwise be detrimental to efficient magnetic tape operation.

It is an additional object of the present invention to provide for a tape reel cartridge storage cell which is so constructed and arranged as to provide a series of juxtaposed arcuate grooves and cooperative latching fingers to facilitate insertion of each of a plurality of tape reel cartridges into each groove for storage on edge in closely spaced side-by-side relation to one another.

In accordance with the present invention, there has been devised a new and useful tape reel cartridge storage cell which is specifically intended for use in storing magnetic tape reel cartridges of the self-threading type in an automated tape library system. A representative cartridge is the IBM self-threading cartridge for storing ½ inch tape reels and which is broadly made up of a cover assembly with a circular rim around its outer peripheral edge having a pivotal latch which is automatically opened by the tape drive mechanism and when opened, the tape can be threaded from the reel through an opening in the rim for reading or writing purposes without necessity of removing the casing from the reel. An illustrative reel cartridge of the type referred to is set forth and described in said U.S. Letters Pat. No. 3,620,478. In the reel cartridge storage cell of the present invention the cell is made up of a body portion of one-piece construction which can be suspended or otherwise supported in such a way as to present one or more forwardly directed arcuate grooves disposed in closely-spaced, side-by-side relation to one another, each groove having a curvature substantially conforming to the outer peripheral edge or rim of the reel cartridge. Reel-gripping means in the form of latching fingers are also a unitary part of the body and are disposed on opposite sides of each groove so as to extend from the body and slightly beyond the associated groove. Each of the latching fingers is of limited resiliency and the spacing between each set of fingers on opposite sides of an associated groove normally is slightly less than the width of the cartridge so that the fingers will spread when a cartridge is pressed edgewise therebetween while at the same time guiding the cartridge into seated position within the associated groove. The holding force of the fingers is such that they will yieldingly engage opposite sides of the cartridge and prevent accidental displacement but will permit selective removal of the cartridge. Moreover, the cell has attaching means which will permit its releasable mounting on a vertical wall panel with the storage grooves curving downwardly and forwardly over a circumferential distance which will cover approximately one-fourth the surface area of the rim of the cartridge. A pair of latching fingers is disposed at the upper terminal end of the groove, and a relatively broad, downwardly sloping beveled surface is formed at the lower end of the groove to cooperate in guiding the cartridge into seated disposition in the groove with the latching fingers yieldingly engaging opposite sides of the cartridge casing so as to releasably retain the cartridge in place within the groove. Thus the storage cell is capable of storing reel cartridges of the type described with a minimum of contamination or abrasion, and will maintain the cartridges on end in closely spaced, juxtaposed relation to one another with the major surface area of the cartridge exposed to permit engagement and removal by the selector or picking mechanism.

The above and other objects, advantages and features will become more readily appreciated and understood from a consideration of the following detailed description when taken together with the accompanying drawings, in which.

Figures 1, 2, 3, 6:
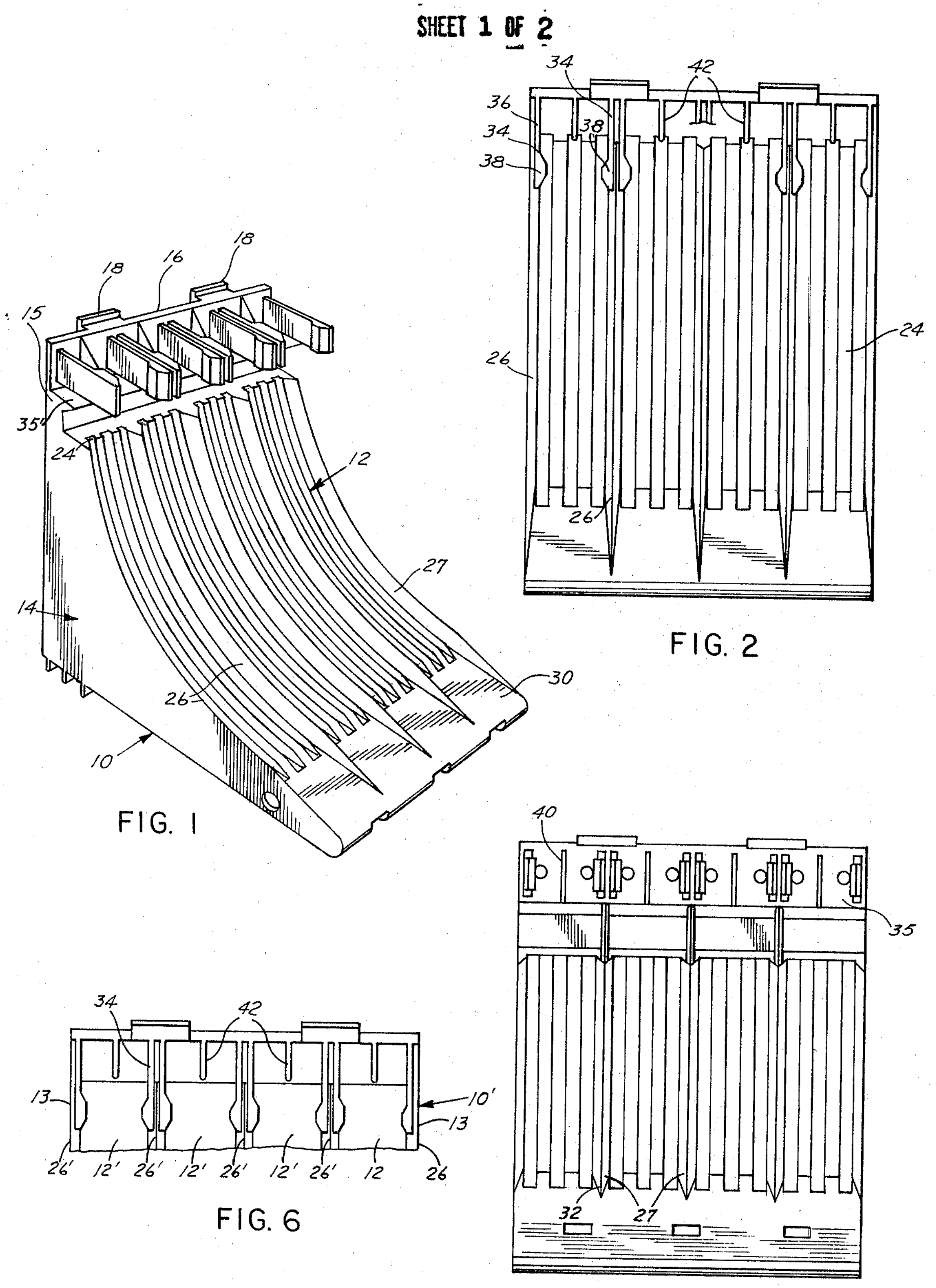
FIG. 1 is an isometric view of a preferred form of tape reel cartridge storage cell in accordance with the present invention.
FIG. 2 is a top plan view of the storage cell shown in FIG. 1.
FIG. 3 is a front elevational view of the preferred form of storage cell shown in FIGS. 1 and 2.
FIG. 6 is a somewhat fragmentary, top plan view of a modified form of storage cell.
Figures 4, 5:
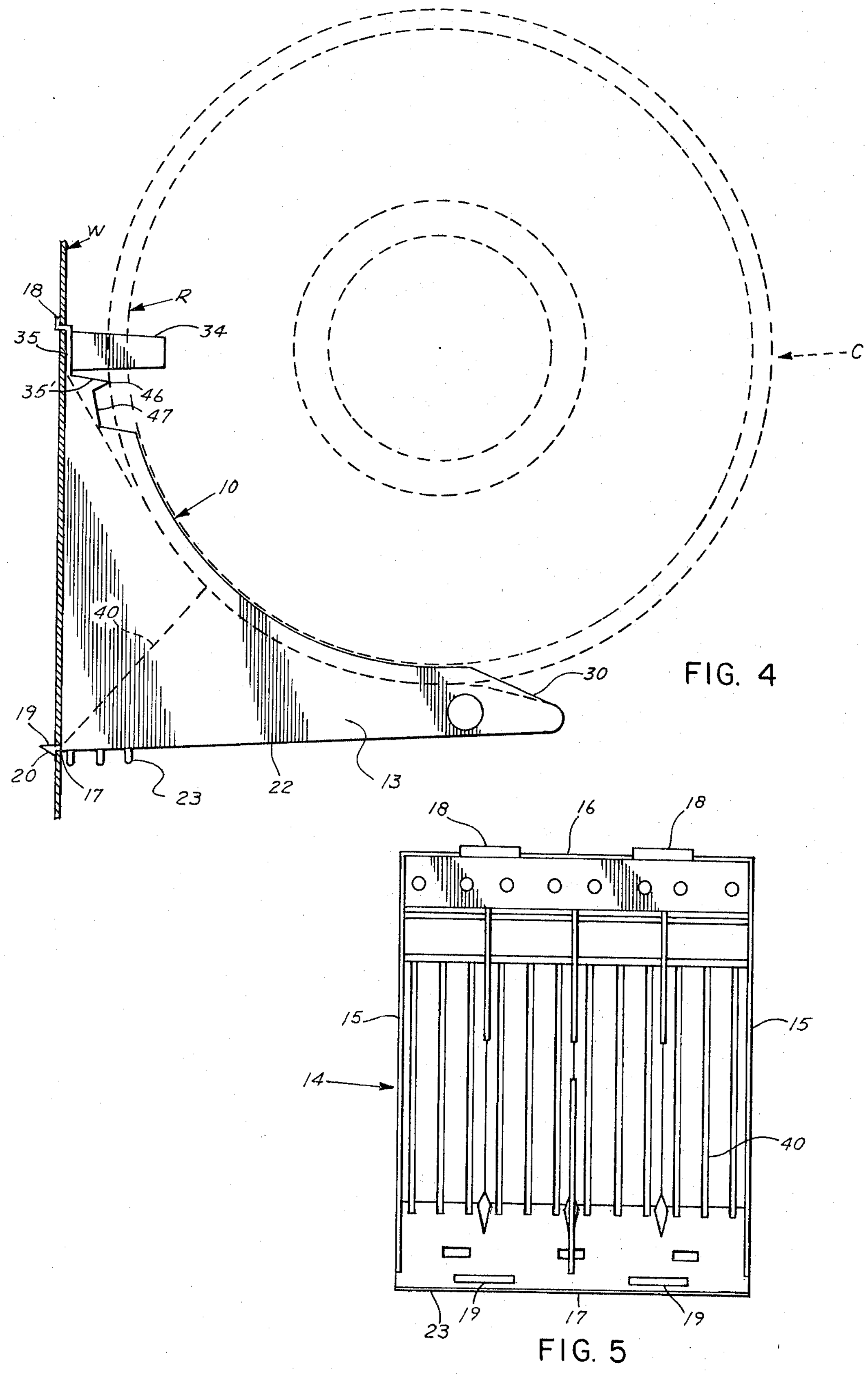
FIG. 4 is a side view thereof in mounted relation to a wall panel.
FIG. 5 is a rear view of the storage cell shown in FIG. 1.

Referring in detail to the drawings, there is shown by way of illustrative example in FIGS. 1 to 5 a preferred form of tape reel cartridge storage cell which is specifically adapted for use in releasably retaining a tape reel cartridge, represented at C, in each of a series of grooves 12 formed along the front surface of the cell 10 between opposite side walls 13. As a setting for the present invention, in one conventional tape reel cartridge of the type referred to there is an outer cylindrical casing into which the tape reel is placed with a cover assembly R extending along the outer peripheral edge of the casing. A suitable slot, not shown, enables removal and threading of the tape past a read/write head when the cartridge is placed on a tape deck.

In order to releasably retain one or more tape reel cartridges of the type described in a storage position, the cell 10 of the present invention consists of an outer one-piece body or frame construction 14 with an open rectangular back defined by opposed vertical edges 15 and upper and lower horizontal edges 16 and 17. A pair of spaced, upwardly projecting attaching tabs 18 are offset rearwardly of the upper edge 16 of the back wall, and a pair of correspondingly spaced tabs 19 project rearwardly in a horizontal direction from the lower edge 17 of the back. Each of the tabs 19 is given a slight rearward taper by the inclined surface 20 which is terminated a slight distance from the back of the body portion. In this way, the upper tabs 18 can be inserted into openings in a wall designated and represented at W in FIG. 4, and the lower tabs are snap-fit into limited openings in the wall until the underside 20 clears the surrounding edges of the opening in the wall with the back of the cell flush against the wall surface as illustrated. The body also includes a bottom solid wall portion 22 with spaced downwardly projecting reinforcing ribs 23; and when the body is suspended from a vertical wall panel the bottom wall 22 will extend forwardly from the wall panel and is tipped slightly upwardly from horizontal as shown.

As illustrated, a series of arcuate, reel-receiving grooves 12 curve downwardly and forwardly from a point adjacent to the upper end of the body to the front edge of the bottom wall 22. Each groove preferably is given a concave curvature corresponding or complementary to the contour of the outer peripheral edge of the cover assembly R and is provided with a series of closely spaced circumferentially extending ribs 24. Flanges 26 on opposite sides of each groove are generally of V-shaped cross-sectional configuration and extend forwardly so as to form outwardly convergent surfaces 27 along opposite sides of the groove to assist in guiding each reel into position by defining an entrance which is slightly wider than the thickness of the reel cartridge. It will be seen also that each of the grooves 12 has a downwardly sloping portion 30 at its front edge which forms a beveled upwardly convergent guide surface for initial engagement with the outer peripheral edge of the reel cartridge in causing the reel cartridge to slide upwardly into the groove. Each flange 26 is also tapered forwardly along the guide surface as indicated at 32 and forms a wider opening for the reel cartridge at the point of initial contact with the groove. As a result it will be seen that a series of grooves 12 are formed in each cell by a common downwardly and forwardly curved wall section which extends between the opposite sides 13 and is interrupted by a series of the flanges 26 at spaced intervals just greater than the width of the reel cartridges.

In order to releasably retain the reel cartridges in position in the grooves, latching fingers or clips 34 are arranged in pairs on opposite sides of each groove. The fingers 34 are of limited resiliency, the spacing between each pair of fingers on opposite sides of the groove normally being slightly less than the width of a reel cartridge so that the fingers are caused to spread slightly when the reel is inserted edgewise therebetween for insertion into the groove whereby to yieldingly engage opposite sides of the cartridge and releasably retain it in the groove. More specifically, the latching fingers 34 are preferably mounted on an upper extension plate 35 which forms an upper continuation of the back of the cell body and is spaced rearwardly of the upper terminal edges of the grooves 12 directly above a triangular protrusion 46 which traverses the width of the body and forms a recess 47 above the grooves. Each latching finger or clip 34 is preferably in the form of a generally rectangular or oblong plate 36 which extends forwardly and horizontally from the upper extension plate 35 and terminates in a slight enlargement or protuberance 38 at its forward free or distal end. Each protuberance 38 projects laterally from the plate in facing relation to a corresponding protuberance of the latching finger on the opposite side of the groove; and together, the protuberances on each pair converge rearwardly from the forward extremities of the fingers for a limited distance to their points of greatest thickness then diverge rearwardly for a limited distance into the surfaces of the plates. Moreover, each pair of latching fingers is aligned with the flanges 26 on opposite sides of each groove and are dimensioned to extend forwardly a limited distance beyond the grooves with the enlargements 38 spaced above and forwardly or directly ahead of the flanges. In this way, after the reel cartridge has made initial contact with the beveled surface 30 it will engage the enlargements 38 at the forward ends of the latching fingers so that the latching fingers will cooperate with the beveled end surfaces 30 in guiding the reel cartridge into position within the groove and thereafter releasably retain the cartridge in place. By virtue of the slight upward tipping of the cell when mounted on a vertical wall panel, the groove 12 will also aid in supporting the cartridge on edge and, coupled with the yielding engagement of the fingers on opposite sides of the cartridge, serve to securely hold it in place while leaving the major portion of the cartridge, particularly the outer peripheral edge, exposed for subsequent engagement and removal by a selector or picking mechanism.

The construction of the cartridge cell as described lends itself well to injection molding into a unitary cell and from materials which can be selected based on strength, low cost and contamination resistance. The latching fingers can be composed of the same material as the body, yet possess increased resiliency by increasing their length of extension from the upper extension plate. Additional reinforcement to make the body of rugged, durable construction may be provided in the form of a vertical web 40 extending intermediately between the bottom wall surface 22 and the inner wall surface of the grooves 12. Also, generally triangular reinforcing webs 42 may extend between the vertical extension plate 35 and horizontal ledge 35'. Of course the ribbing 24 along the grooves also serves as added reinforcement as well as the generally triangular configuration of the entire body so as to permit formation of the cell out of a hollow body or frame.

In use, the cell is shown suspended from the vertical wall panel W by inserting the tabs 18 and 19 through openings in the wall so that the cell will project forwardly and be tipped slightly in an upward direction in its extension away from the wall panel. As a reel cartridge is advanced horizontally toward the cell, and assuming that the lower peripheral edge of the cartridge is horizontally aligned with the lower forward extremity of the bottom surface 22 of the cell, it will initially contact the beveled surface 30 and the flanges 26. Continued edgewise horizontal movement of the cartridge will cause it to slide upwardly along the beveled surface and to pass between the latching fingers so as to be guided rearwardly into seated disposition within the groove. Any slight misalignment of the reel cartridge with respect to the groove is compensated for by the inclined forwardly tapered portions 27 of the flanges 26 which will cause the outer peripheral edge of the reel cartridge to become properly seated against the ribbed or inner surface of the groove.

Storage in the manner described also facilitates removal of the cartridge from the storage cell since a major portion of the cartridge remains exposed to facilitate engagement by suitable selector or picking mechansim. For example, such may be accomplished by a vacuum chuck forming a part of the picking mechanism which will engage the exposed outer peripheral edge of rim of the cartridge and, under vacuum, effect removal of the cartridge by overcoming the holding pressure of the latching fingers.

A modified form of storage cell 10' is illustrated in FIG. 6 wherein the ribbing 24 in the form of FIGS. 1 to 5 has been removed to define relatively deep grooves 12' between the flanges 26' having smooth, flat bearing surfaces as shown between the vertical side edges of the flanges 26'. In this way, the grooves 12' will afford increased lateral support for the cartridges inserted therein. Other like elements shown in FIG. 6 to those of FIGS. 1 to 5 are correspondingly enumerated.

While a preferred embodiment of the present invention has been shown and described, it will be obvious to those skilled in the art that various modifications and substitutions may be made without departing from the spirit and scope of the invention as defined by the appended claims and any reasonable equivalents thereof. For example, the ribbing 24 in the grooves 12 may be eliminated. Also, the enlargements 38 on the fingers 34 on one side of the grooves may be slightly smaller than those on the opposite side, as shown in FIG. 2, in order to accommodate unequal-sized ring flanges on a cartridge.

What is claimed is:

1. A reel storage cell adapted for releasable retention of a plurality of tape reel cartridges and the like wherein each cartridge is characterized by having an outer, generally circular peripheral edge portion, said storage cell comprising:

a body portion having a plurality of forwardly directed, arcuate grooves curving downwardly and forwardly in closely-spaced parallel relation to one another over an arc of substantially 90°, the curvature of each groove conforming to that of the outer peripheral edge of the cartridge, and a downwardly and forwardly divergent guide surface at the front, lower end of each groove; and latching fingers disposed adjacent to the upper rearwardmost point on opposite sides of each groove and extending forwardly for a limited distance, said fingers being possessed of limited resiliency and the spacing between each set of fingers on opposite sides of a groove normally being slightly less than the width of the groove so that each set of fingers will spread when a cartridge is pressed edgewise therebetween whereby to yieldingly engage the cartridge and releasably retain same in an associated groove.

2. A reel storage unit according to claim 1, there being at least one pair of fingers in opposed facing relation to one another on opposite sides of the groove.

3. A reel storage unit according to claim 1 each set of said latching fingers for a groove having enlargements at their forward distal ends, each enlargement projecting inwardly toward the finger on the opposite side of the groove and cooperating therewith to define an entrance for guiding the reel into the groove.

4. A steel cartridge storage cell according to claim 1, the surface of each groove having circumferentially extending ribs at closely spaced intervals across the groove.

5. A reel storage cartridge cell according to claim 1, the opposite sides of each groove diverging forwardly away from the inner surface of the groove to assist in guiding a cartridge into seated disposition within its respective groove.

6. A reel storage cartridge cell according to claim 1, further including a finger support plate spaced upwardly and rearwardly with respect to the uppermost point of the grooved surfaces, said latching fingers extending forwardly from said support plate beyond the forward edges of the sides of the groove, that portion of the fingers extending beyond the sides of the groove being defined by enlarged forward distal ends having rearwardly convergent sides forming limited entrances for pressfit insertion of a cartridge between each set of fingers into seated relation to the groove.

7. A reel storage cartridge cell according to claim 6, the sides of each groove being forwardly tapered along the forwardly divergent surface of the groove so as to form guide surfaces to guide movement of each cartridge into seated disposition within a respective groove.

8. A reel storage cartridge cell according to claim 7, the body of each cell having a rear vertical edge provided with rearwardly directed tabs for mounting of said cell in vertical disposition in a vertical surface, and the body having a bottom edge surface at an angle less than 90° to the vertical edge so as to be tilted upwardly at an acute angle from the horizontal.

9. A reel storage cell adapted for releasable retention of a plurality of tape reel cartridges and the like wherein each cartridge is characterized by having an outer, generally circular peripheral edge portion, said storage cell comprising:

a hollow body portion having opposite side walls, a bottom wall, an open back, and a front curved wall including a plurality of forwardly directed, concave grooves curving downwardly and forwardly in closely spaced, parallel relation to one another and each terminating at its front end in an entrance guide surface so as to be adapted for lateral insertion of tape cartridges therein, the curvature of each groove conforming to that of the outer peripheral edge of the cartridge;

yieldable reel gripping means disposed on opposite sides of each groove and extending forwardly of the front wall surface for a limited distance, said gripping means being spaced above each of the grooves with the grooves curving forwardly and downwardly therefrom; and rearwardly directed tabs on the back of said body portion for suspension of said cell in vertical disposition on a vertical surface such that the bottom wall is at an angle less than 90° to the vertical back so as to be tilted upwardly at an acute angle from the horizontal.

10. A reel cartridge storage cell according to claim 9, the surface of each groove engageable with a reel cartridge having circumferentially extending ribs at closely spaced intervals across each groove.

11. A reel storage cartridge cell according to claim 9, opposite sides of each groove diverging forwardly away from the inner surface of the groove to assist in guiding a cartridge into seated disposition within its respective groove.

12. A reel storage cartridge cell according to claim 9, the forward end of each groove inclining downwardly and forwardly away from the concave surface of each groove and the sides of each groove being forwardly tapered along the forwardly inclined surface of the groove so as to form said entrance guide surfaces to guide movement of each cartridge into proper seated disposition within a respective groove.

* * * * *